United States Patent
Inoue

(10) Patent No.: US 9,723,825 B2
(45) Date of Patent: Aug. 8, 2017

(54) FISHING REEL DRIVE GEAR AND FISHING REEL PINION GEAR MESHED WITH SAME

(71) Applicant: Shimano Inc., Sakai, Osaka (JP)

(72) Inventor: Tetsuo Inoue, Osaka (JP)

(73) Assignee: Shimano Inc., Osaka (JP)

( * ) Notice: Subject to any disclaimer, the term of this patent is extended or adjusted under 35 U.S.C. 154(b) by 476 days.

(21) Appl. No.: 14/489,010

(22) Filed: Sep. 17, 2014

(65) Prior Publication Data

US 2015/0164056 A1   Jun. 18, 2015

(30) Foreign Application Priority Data

Dec. 16, 2013  (JP) ................................. 2013-259045

(51) Int. Cl.
   *A01K 89/01* (2006.01)
   *A01K 89/015* (2006.01)

(52) U.S. Cl.
   CPC ............ *A01K 89/015* (2013.01); *A01K 89/01* (2013.01)

(58) Field of Classification Search
   CPC .. A01K 89/01; A01K 89/015; A01K 89/0183; A01K 89/01902
   See application file for complete search history.

(56) References Cited

U.S. PATENT DOCUMENTS

| | | | | |
|---|---|---|---|---|
| 2,585,971 A | * | 2/1952 | Sloane | F16H 1/04 74/393 |
| 5,069,604 A | * | 12/1991 | Al-Sabih | F01C 1/077 123/245 |
| 6,080,199 A | * | 6/2000 | Umeyama | F16H 55/0806 29/893.3 |
| 2004/0191101 A1 | * | 9/2004 | Ogata | F04C 2/084 418/171 |
| 2006/0111018 A1 | * | 5/2006 | Kopp | B23F 17/001 451/5 |
| 2011/0271780 A1 | * | 11/2011 | Ikemura | F16H 55/08 74/458 |
| 2013/0220050 A1 | | 8/2013 | Koike | |

FOREIGN PATENT DOCUMENTS

| | | |
|---|---|---|
| JP | 2002-291383 A | 10/2002 |
| JP | 2012-120444 A | 6/2012 |

OTHER PUBLICATIONS

European Search Report of corresponding EP Application No. 14 19 4072.6 dated Apr. 28, 2015.

* cited by examiner

*Primary Examiner* — Emmanuel M Marcelo
(74) *Attorney, Agent, or Firm* — Global IP Counselors, LLP

(57) ABSTRACT

A drive gear for a spinning reel is meshed with a pinion gear. The drive gear has a gear body, a plurality of drive gear teeth and a waveform regulating part. The gear body is mounted onto a drive shaft. The plurality of drive gear teeth are disposed on an outer peripheral side of the gear body, are circumferentially disposed at intervals and are meshed with the pinion gear. The waveform regulating part is disposed on at least a part of the plural drive gear teeth, and is configured to regulate a waveform of a vibration produced in meshing in an irregular pattern. The waveform regulating part is configured to regulate the waveform in the irregular pattern by having at least one feature of the drive gear teeth be different from the rest of the drive gear teeth, the at least one feature being selected from the group consisting of a pressure angle, a pitch, a torsion angle, a tooth profile shape and a tooth trace shape.

19 Claims, 10 Drawing Sheets

FISHING REEL DRIVE GEAR AND FISHING REEL PINION GEAR MESHED WITH SAME

CROSS-REFERENCE TO RELATED APPLICATIONS

This application claims priority to Japanese Patent Application No. 2013-259045 filed on Dec. 16, 2013, the entirety of which is hereby incorporated by reference in its entirety.

BACKGROUND

Field of the Invention

The present invention relates to a gear, particularly to a fishing reel drive gear and a fishing reel pinion gear meshed with the fishing reel drive gear.

Background Information

A conventional fishing reel includes a rotation transmission mechanism configured to wind a fishing line about a spool by rotation of a handle. The rotation transmission mechanism includes a drive gear and a pinion gear. The drive gear is configured to be rotated in conjunction with the handle. The pinion gear is meshed with the drive gear. For example, a drive gear, coupled through a drag mechanism to a drive shaft rotatable in conjunction with the rotation of a handle, has been known as an exemplary drive gear for a dual-bearing reel configured to wind a fishing line by a rotatable spool. Further, another type of drive gear, mounted to the drive shaft while being unitarily rotatable therewith, has been also known as an exemplary drive gear for a dual-bearing reel. In such a dual-bearing reel, the drive gear is meshed with the pinion gear for rotating the spool. Each of the drive gear and the pinion gear has either spur teeth or helical teeth, and the drive gear teeth and the pinion gear teeth are meshed with each other.

A drive gear, unitarily rotatable with a drive shaft configured to be rotated in conjunction with rotation of a handle, has been well-known as an exemplary drive gear for a spinning reel configured to wind a fishing line about a spool by a rotor. In such a spinning reel, the drive gear has a plurality of face gear teeth, whereas a pinion gear has spur teeth to be meshed with the face gear teeth.

Incidentally, a drive gear for a fishing reel that can enhance rotational feeling to be transmitted to the handle when the handle is rotated for winding the fishing line is well known (see Japan Laid-open Patent Application Publication No. JP-A-2012-120444). In such a well-known fishing reel, the number of teeth of the drive gear is increased by reducing the module of the drive gear and that of the pinion gear. Accordingly, the period of vibration to be transmitted to the handle is reduced, and the rotational feeling is enhanced.

In the well-known drive gear for a fishing reel, the module of the drive gear is reduced whereby the period of vibration is reduced and the rotational feeling is enhanced. Therefore, the period of vibration becomes constant with respect to the rotation speed of the handle. In other words, monotonous vibrations are transmitted to the handle.

SUMMARY

It is an object of the present invention to further enhance the rotational feeling to be transmitted to a handle in a fishing reel.

A drive gear for a fishing reel according to the present invention is mounted onto a drive shaft for the fishing reel, and is meshed with a pinion gear. The drive gear includes a gear body having a disc shape, a plurality of drive gear teeth and a waveform regulating part. The gear body is mounted onto the drive shaft. The drive gear teeth are disposed on an outer peripheral side of the gear body, are circumferentially disposed at intervals, and are meshed with the pinion gear. The waveform regulating part is disposed on at least a part of the drive gear teeth and is configured to regulate a waveform of a vibration produced when meshing the drive gear teeth with the pinion gear in an irregular pattern. The waveform regulating part is configured to regulate the waveform in the irregular pattern by causing at least one feature of the drive gear teeth to be different from the remainder of the drive gear teeth, the at least one feature being selected from the group consisting of a pressure angle, a pitch, a torsion angle, a tooth profile shape and a tooth trace shape.

According to the present drive gear, the waveform regulating part includes at least one of the drive gear teeth being different from the rest of the drive gear teeth regarding at least one feature selected from the group including the pressure angle, the pitch, the torsion angle, the tooth profile shape and the tooth trace shape. Thus, vibrations transmitted to the handle are a complicated combination of vibrations. It is thereby possible to obtain texture vibrations that are just like vibrations to be produced when a given object is slid along the surface of a texture made of fibers (e.g., silk or velvet). Consequently, it is possible to further enhance the rotational feeling to be transmitted to the handle in the fishing reel.

The waveform regulating part may be configured to regulate the waveform in the irregular pattern by having the at least one of the drive gear teeth be different from the remainder of the drive gear teeth with respect to at least the pressure angle. According to the structure, the waveform can be relatively easily set in the irregular pattern.

The waveform regulating part may be configured to regulate the waveform in the irregular pattern by having the at least one of the drive gear teeth be different from the remainder of the drive gear teeth with respect to at least the pitch. According to the structure, the period and the amplitude of vibration can be changed by changing the pitch. The waveform can be thereby changed into the irregular pattern.

The waveform regulating part may be configured to regulate the waveform in the irregular pattern by having the at least one of the drive gear teeth be different from the remainder of the drive gear teeth with respect to at least the torsion angle. According to the structure, the period and the amplitude of vibration can be changed by changing the torsion angle. The waveform can be thereby changed into the irregular pattern.

The waveform regulating part may be configured to regulate the waveform in the irregular pattern by having the at least one of the drive gear teeth be different from the remainder of the drive gear teeth with respect to at least the tooth profile shape. According to the structure, the period and the amplitude of vibration can be changed by changing the tooth profile shape. The waveform can be thereby changed into the irregular pattern.

The waveform regulating part may be configured to regulate the waveform in the irregular pattern by having the at least one of the drive gear teeth be different from remainder of the drive gear teeth with respect to at least the tooth trace shape. According to the structure, the period and the amplitude of vibration can be changed by changing the tooth trace shape. The waveform can be thereby changed into the irregular pattern.

The drive gear teeth may include face gear teeth formed on an outer peripheral surface of the gear body. According to the structure, it is possible to further enhance the rotational feeling to be transmitted to the handle in a spinning reel.

The drive gear teeth may include either spur teeth or helical teeth formed on the outer peripheral surface of the gear body. According to the structure, it is possible to further enhance the rotational feeling to be transmitted to the handle in a dual-bearing reel.

A pinion gear for a fishing reel according to another aspect of the present invention enables a spool shaft for the fishing reel to penetrate therethrough and is meshed with drive gear teeth of a drive gear mounted onto a drive shaft. The pinion gear includes a gear body having a tubular shape, a plurality of pinion gear teeth and a waveform regulating part. The gear body enables the spool shaft to penetrate therethrough. The pinion gear teeth are disposed on an outer peripheral surface of the gear body, are circumferentially disposed at intervals and are meshed with the drive gear teeth. The waveform regulating part is disposed on at least a part of the pinion gear teeth, and is configured to regulate a waveform of a vibration produced when meshing the pinion gear teeth with the drive gear teeth in an irregular pattern. The waveform regulating part is configured to regulate the waveform in the irregular pattern by having at least one feature of the pinion gear teeth be different from the rest of the pinion gear teeth, the at least one feature being selected from the group consisting of a pressure angle, a pitch, a torsion angle, a tooth profile shape and a tooth trace shape.

According to the pinion gear, the waveform regulating part has at least one of the pinion gear teeth different from the rest of the pinion gear teeth regarding at least one feature selected from the group consisting of the pressure angle, the pitch, the torsion angle, the tooth profile shape and the tooth trace shape. Thus, vibrations to be transmitted to a handle are a complicated combination of vibrations. It is thereby possible to obtain texture vibrations that are just like vibrations to be produced when a given object is slid along the surface a texture made of fibers (e.g., silk or velvet). Consequently, it is possible to further enhance rotational feeling transmitted to the handle in the fishing reel.

According to the present invention, the waveform of vibration to be produced in meshing between the drive gear and the pinion gear is set in the irregular pattern. Thus, vibrations transmitted to the handle are a complicated combination of vibrations. It is thereby possible to obtain texture vibrations that are just like vibrations to be produced when a given object is slid along the surface of a texture made of fibers (e.g., silk or velvet). Consequently, it is possible to further enhance the rotational feeling to be transmitted to the handle in the fishing reel.

BRIEF DESCRIPTION OF THE DRAWINGS

Referring now to the attached drawings which form a part of this original disclosure.

DETAILED DESCRIPTION OF EMBODIMENTS

First Exemplary Embodiment

Figure 1:
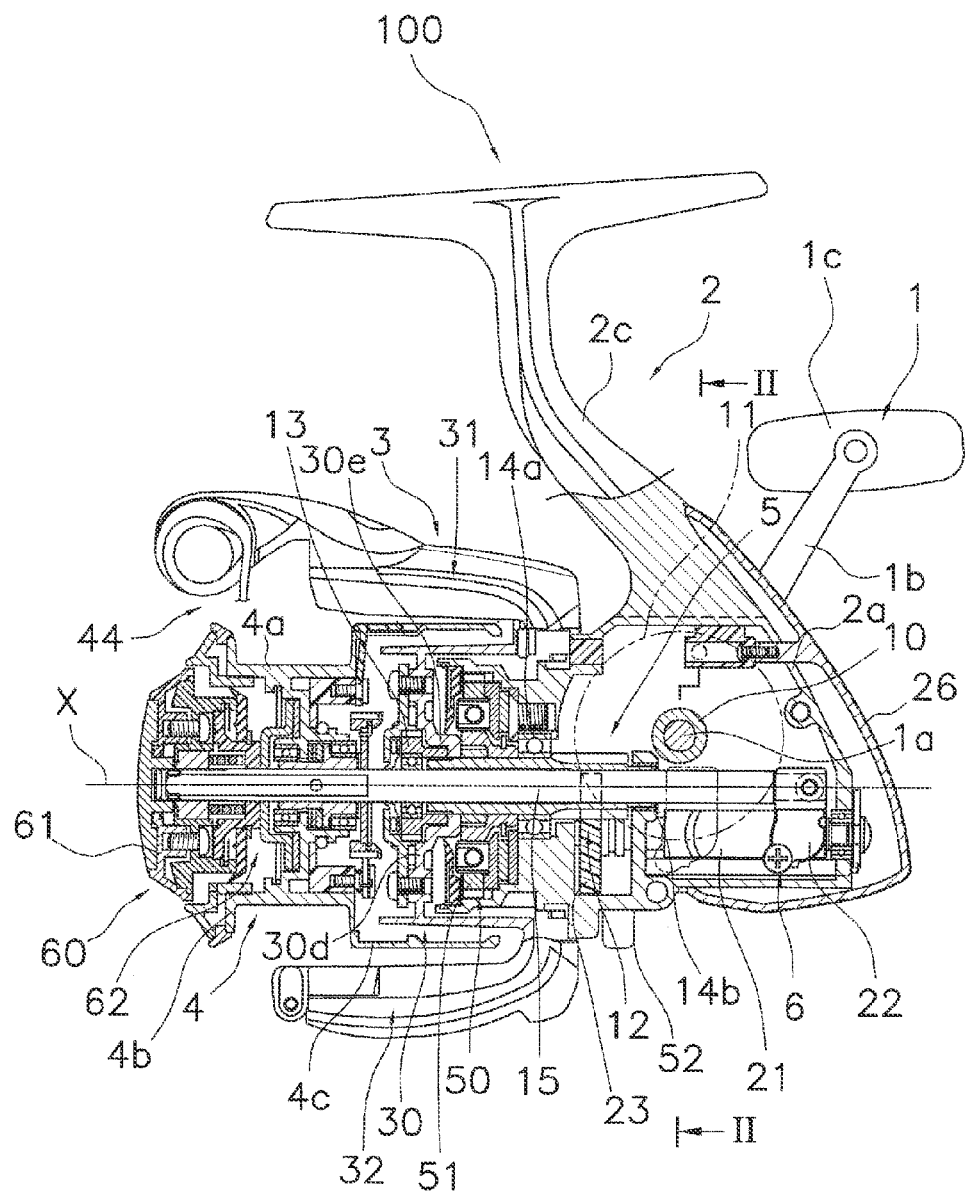
FIG. 1 is a cross-sectional side view of a spinning reel employing a first exemplary embodiment of the present invention.

As illustrated in FIG. 1, a spinning reel 100 (an exemplary fishing reel) employing a first exemplary embodiment of the present invention includes a handle 1, a reel unit 2, a rotor 3 and a spool 4. The reel unit 2 supports the handle 1 in a rotatable state. The rotor 3 is rotatably supported at the front of the reel unit 2. The spool 4 is configured to wind a fishing line onto the outer peripheral surface thereof. The spool 4 is disposed at the front of the rotor 3, while being movable back and forth. It should be noted that the handle 1 is attachable to either of the right side and the left side of the reel unit 2.

The handle 1 includes a handle shaft 1a, a handle arm 1b and a handle knob 1c. The handle arm 1b extends from the handle shaft 1a in a radial direction of the handle shaft 1a. The handle knob 1c is rotatably mounted to the tip end of the handle arm 1b.

<Structure of Reel Unit>

Figure 2:
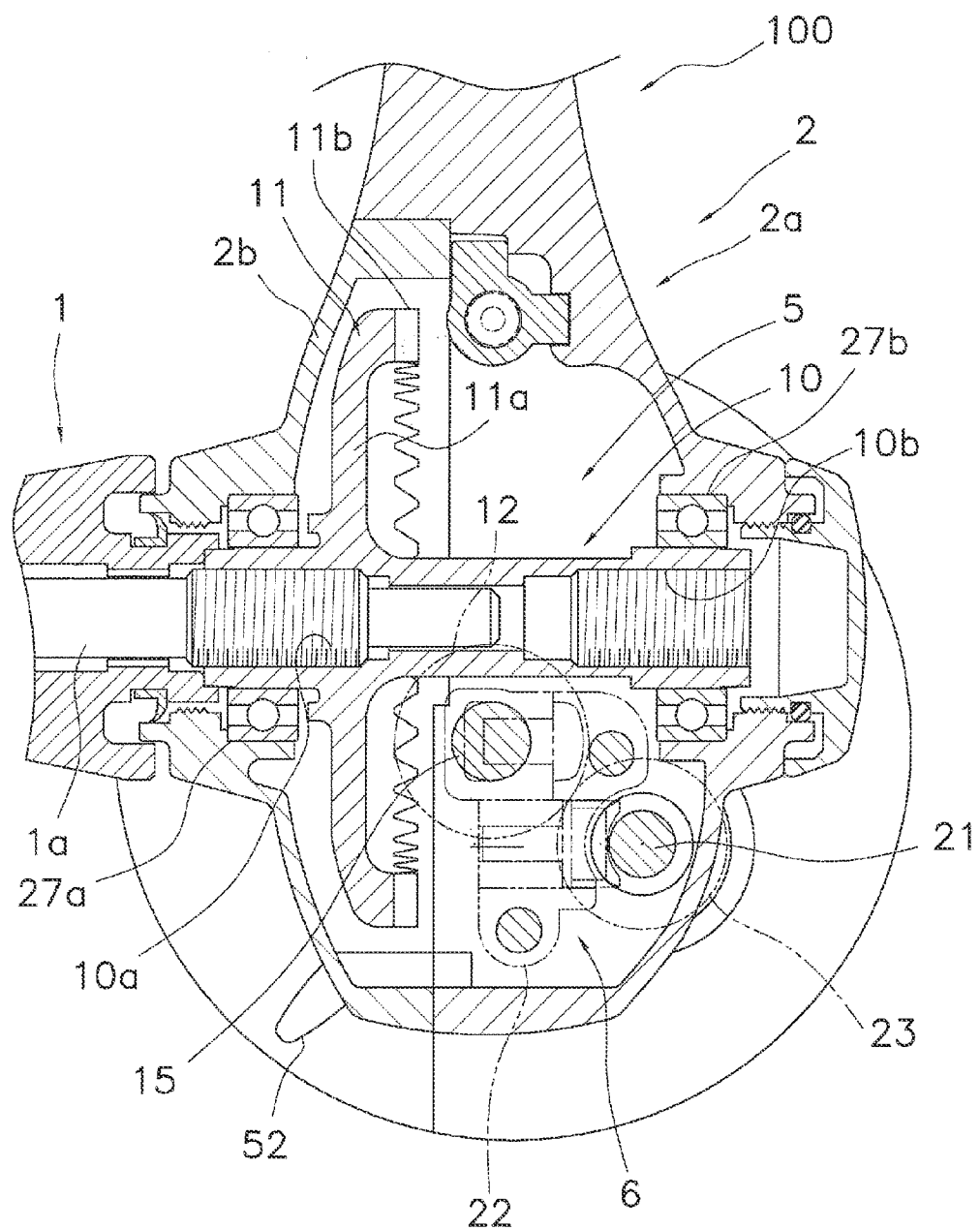
FIG. 2 is a cross-sectional rear view of the spinning reel of FIG. 1 taken along a cutaway line II-II.

As illustrated in FIG. 1, the reel unit 2 includes a reel body 2a and a lid member 2b (see FIG. 2). The reel body 2a has a laterally opened accommodation space in the interior thereof. The lid member 2b is detachably attached to the reel body 2a in order to close the opening of the accommodation space within the reel body 2a. Further, the reel unit 2 includes a reel unit guard 26 for covering the rear part of the reel body 2a and that of the lid member 2b.

The reel body 2a is made of, for instance, light metal alloy such as magnesium alloy, aluminum alloy or so forth. Further, the reel body 2a has a fishing rod attachment leg 2c integrally formed on the top thereof. The fishing rod attachment leg 2c has a T-shape and the top part thereof extends back and forth. As illustrated in FIG. 1, the reel body 2a accommodates a rotor drive mechanism 5 and an oscillating mechanism 6 in the accommodation space.

<Structure of Rotor Drive Mechanism>

Figure 3:
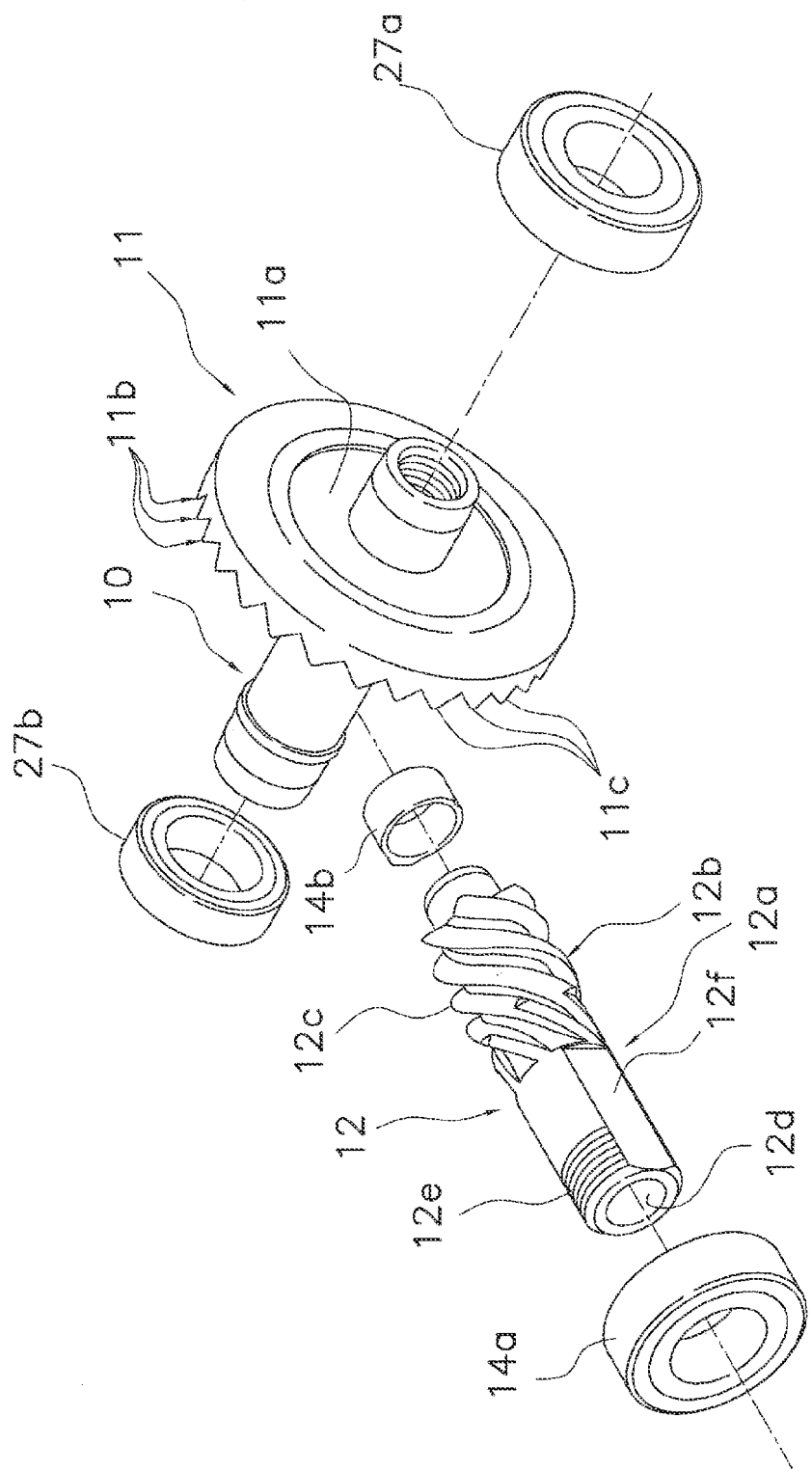
FIG. 3 is an exploded perspective view of a rotor drive mechanism.

The rotor drive mechanism 5 is configured to rotate the rotor 3 in conjunction with rotation of the handle 1 in order to transmit the rotation of the handle 1 to the rotor 3. As illustrated in FIGS. 2 and 3, the rotor drive mechanism 5 includes a drive gear 11 and a pinion gear 12. The drive gear 11 is configured to be rotated with a drive shaft 10 to which the handle shaft 1a of the handle 1 is coupled in a unitarily rotatable state. The pinion gear 12 is meshed with the drive gear 11.

As illustrated in FIG. 2, the drive gear 11 is integrally formed with the drive shaft 10 in the present exemplary embodiment. Alternatively, the drive gear 11 may be separately formed from the drive shaft 10. The drive shaft 10 is screwed and coupled onto the handle shaft 1a in a unitarily rotatable state in the present exemplary embodiment. Alliteratively, the drive shaft 10 may be coupled onto the handle shaft 1a in a unitarily rotatable state, while a non-circular cross-sectional part of the drive shaft 10 is engaged with that of the handle shaft 1a. The drive shaft 10 is rotatably mounted to the reel unit 2 through bearings 27a and 27b. The bearing 27a is mounted to the lid member 2b, whereas the bearing 27b is mounted to the reel body 2a. The drive shaft 10 has a left female threaded part 10a and a right female threaded part 10b on the inner peripheral surfaces of the both ends thereof. Either of the left female threaded part 10a and the right female threaded part 10b is allowed to be screwed onto the handle shaft 1a. In this case, the left female threaded part 10a, disposed closer to the drive gear 11, is a left handed screw, whereas the right female threaded part 10b, disposed away from the drive gear 11, is a right handed screw. Therefore, as the handle shaft 1a, two types of handle shafts are prepared to be used for the left handed screw and the right handed screw.

Figure 4:
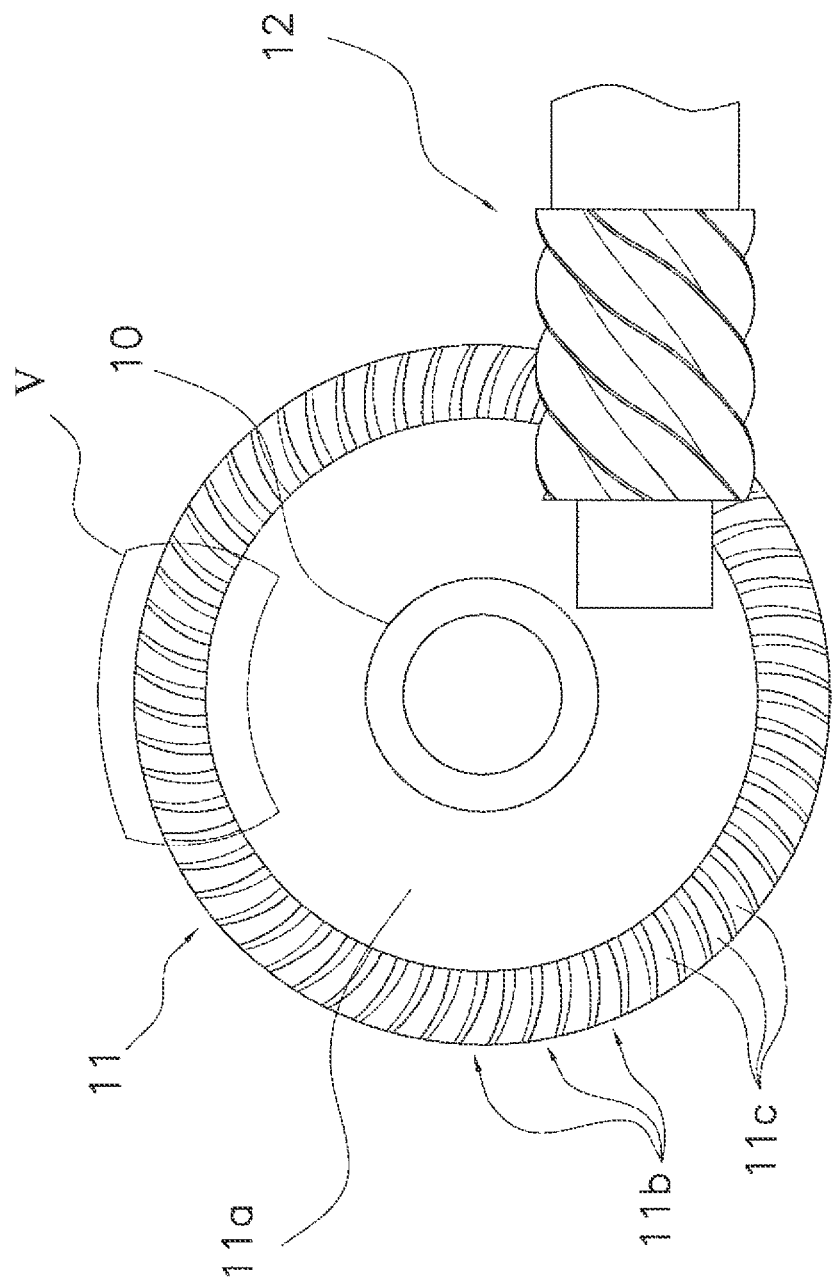
FIG. 4 is a plan view of the rotor drive mechanism.

As illustrated in FIGS. 3 and 4, the drive gear 11 is a face gear. The drive gear 11 has a gear body 11a, a plurality of drive gear teeth 11b and at least one waveform regulating part 16 (see FIG. 5). The gear body 11a is a disc-shaped part disposed on the drive shaft 10. The drive gear teeth 11b are disposed on the outer peripheral part of the gear body 11a, while being circumferentially aligned at intervals. The drive gear teeth 11b are meshed with the pinion gear 12. The at least one waveform regulating part 16 is disposed on at least a part of the drive gear teeth 11b. The drive gear teeth 11b have face gear teeth 11c. The face gear teeth 11c are formed on the outer peripheral part of one lateral surface of the gear body 11a, while being circumferentially aligned at intervals. The drive gear 11 is integrally formed with the drive shaft 10 by forging of, for instance, aluminum alloy. As illustrated in FIG. 5, each of the face gear teeth 11c has a first tooth surface 11d and a second tooth surface 11e. The first tooth surface 11d is configured to be meshed with the pinion gear 12 when the handle 1 is rotated in a fishing-line winding direction. The second tooth surface 11e is configured to be meshed with the pinion gear 12 when the handle 1 is rotated in a fishing-line releasing direction. The first tooth surface 11d is formed as a coast (i.e., a concave surface) that has the center part in the tooth trace direction being recessed. On the other hand, the second tooth surface 11e is formed as a drive (i.e., a convex surface) that has the center part in the tooth trace direction protruding.

Figure 5A:
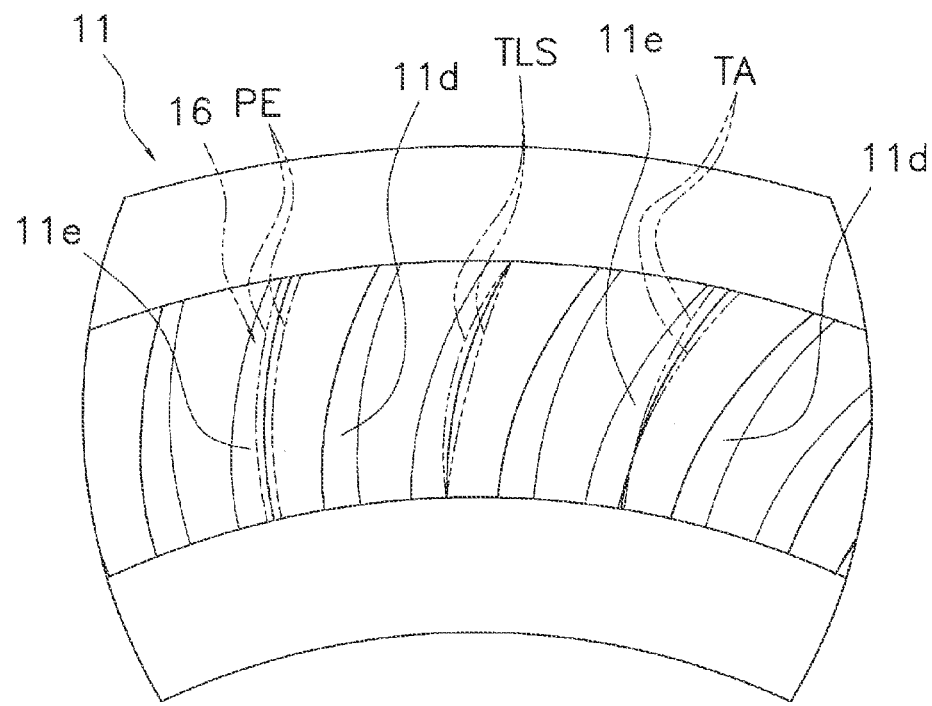
FIG. 5A is a schematic plan view of a waveform regulating part of a drive gear in the spinning reel.
Figure 5B:
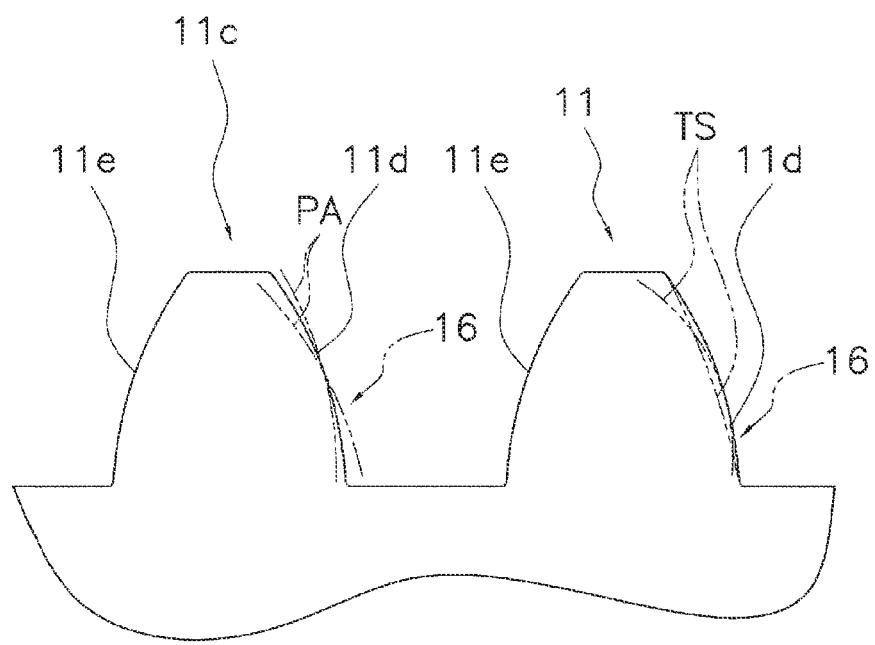
FIG. 5B is a schematic side view of a waveform regulating part of a drive gear in the spinning reel.
Figure 6:
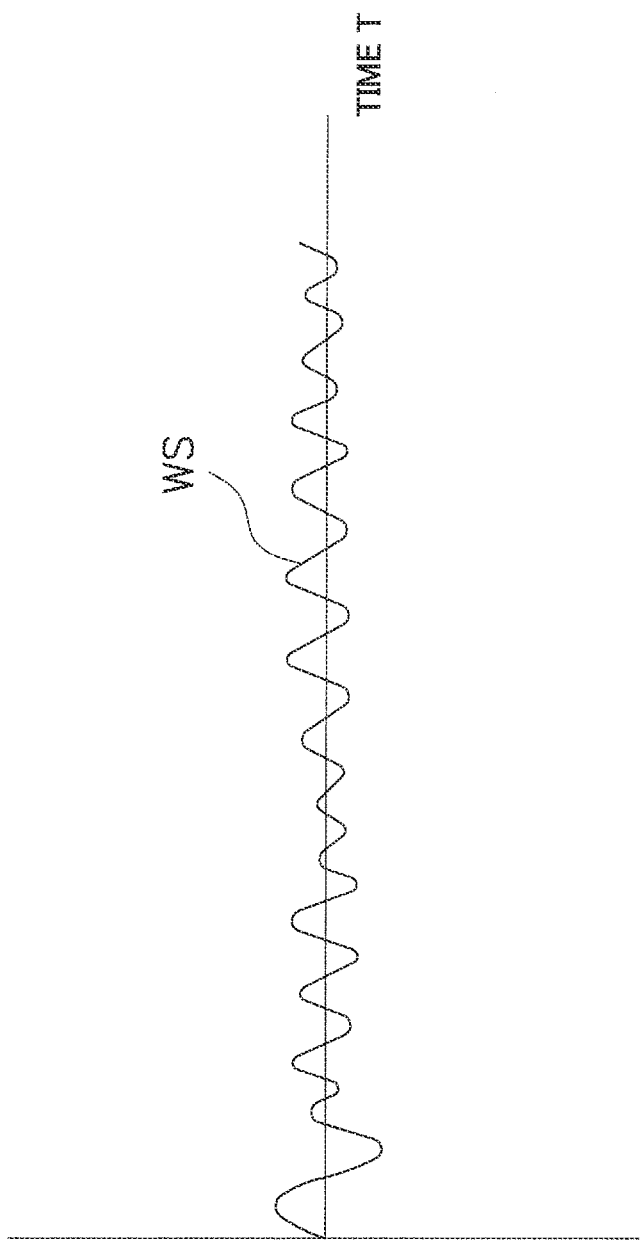
FIG. 6 is a schematic diagram of a waveform of vibration produced in rotating a handle in a fishing-line winding direction.

The waveform regulating part 16 is disposed on the first tooth surface 11d that is configured contact the pinion gear 12 when the handle 1 is rotated in the fishing-line winding direction. As illustrated in FIG. 6, the waveform regulating part 16 serves to regulate a waveform WS in an irregular pattern. The waveform WS is a waveform of vibration that is produced when the drive gear 11 is meshed with the pinion gear 12. Incidentally, the shapes of the first tooth surfaces 11d of the plural face gear teeth 11c are normally formed as precisely as possible, and the same gear specifications are set for the face gear teeth 11c. Unlike this precision, the waveform regulating part 16 is formed by purposefully causing at least one of the face gear teeth 11c to be different from the rest of the face gear teeth 11c regarding at least one gear specification, in other words, by purposefully producing an error (difference) between the at least one gear specification for at least one of the face gear teeth 11c and that for the rest of the face gear teeth 11c. Specifically, as depicted with dashed two-dotted lines in FIG. 5, the at least one waveform regulating part 16 regulates the waveform WS in the irregular pattern by causing at least one of the face gear teeth 11c to be different from the rest of the face gear teeth 11c regarding at least one feature selected from the group including a pressure angle PA, a pitch PE, a torsion (or helix) angle TA, a tooth profile shape TS and a tooth trace shape TLS.

In the first exemplary embodiment, the at least one waveform regulating part 16 is formed by causing a part of the face gear teeth 11c to be different from the rest of the face gear teeth 11c regarding the tooth profile shape TS. For example, the gear specifications of the drive gear 11 are set as follows: the teeth number of 31; an outer diameter of 25.9 mm; an inner diameter of 21.4 mm; and a reference offset of 6.5 mm. It should be noted that the gear specifications such as the number of teeth are not accurately depicted in FIGS. 3 and 4.

As illustrated in FIG. 3, the pinion gear 12 has a gear body 12a and pinion gear teeth 12b. The gear body 12a has a tubular shape. The pinion gear teeth 12b are formed on the outer peripheral surface of the rear part of the gear body 12a. The gear body 12a is mounted to the reel body 2a, while being rotatable about an axis (i.e., a spool shaft 15) arranged so as to be skewed relative to the drive shaft 10. The gear body 12a is rotatably supported by the reel body 2a through a front bearing 14a and a rear bearing 14b. The front bearing 14a is herein disposed forward of the pinion gear teeth 12b, whereas the rear bearing 14b is disposed rearward of the pinion gear teeth 12b. The gear body 12a has a through hole 12d formed in the center thereof for enabling the spool shaft 15 to penetrate therethrough. The gear body 12a has a male threaded part 12e formed on the outer peripheral surface of the front end thereof. A nut 13 is screwed onto the male threaded part 12e for fixing the rotor 3. The pinion gear teeth 12b have helical teeth 12c to be meshed with the drive gear teeth 11b. The pinion gear 12 further has a pair of antirotation facets 12f on the outer peripheral surface of the front part thereof. The anti-rotation facets 12f are parallel facets used for coupling the rotor 3 onto the pinion gear 12 in a unitarily rotatable state. The drive gear 11 and the pinion gear 12 are designed to be meshed at a reference mesh height. For example, the gear specifications of the pinion gear 12 are set as follows: a module of 0.65 mm; a pressure angle of 20; a teeth number of 6; an addendum modification coefficient of +0.5; and a torsion angle of 55 degrees.

<Other Structures>

As illustrated in FIGS. 1 and 2, the oscillating mechanism 6 is a mechanism configured to move the spool shaft 15 coupled to the center part of the spool 4 back and forth through a drag mechanism 60 in order to move the spool 4 in the same direction as the spool shaft 15. The oscillating mechanism 6 includes a traverse cam shaft 21, a slider 22 and an intermediate gear 23. The traverse cam shaft 21 is disposed below and in parallel to the spool shaft 15. The slider 22 is guided by the reel body 2a, while being movable back and forth along the traverse cam shaft 21. The intermediate gear 23 is fixed to the tip of the traverse cam shaft 21. The rear end of the spool shaft 15 is fixed to the slider 22 in a non-rotatable state. The intermediate gear 23 is meshed with the pinion gear 12.

The rotor 3 is made of, for instance, light metal alloy such as magnesium alloy or aluminum alloy. As illustrated in FIG. 1, the rotor 3 is coupled to the pinion gear 12 in a non-rotatable state. However, the rotor 3 is rotatable with respect to the reel unit 2. The rotor 3 includes a tubular portion 30, a first rotor arm 31 and a second rotor arm 32. The tubular portion 30 is coupled to the pinion gear 12 in a unitarily rotatable state. The first and second rotor arms 31 and 32 are connected to the rear part of the tubular portion 30, while being opposed to each other. Each of the first and second rotor arms 31 and 32 forwardly extends at an interval from the tubular portion 30.

The tubular portion 30 of the rotor 3 has a disc-shaped wall part 30d on the inner peripheral side of the front part thereof. The wall part 30d has a boss 30e in the center part thereof. The boss 30e is coupled to the pinion gear 12 in a unitarily rotatable state. The front part of the pinion gear 12 penetrates through the inner periphery of the boss 30e, while the anti-rotation facets 12f formed on the front part of the pinion gear 12 are fitted to the inner peripheral surface of the boss 30e in a unitarily rotatable state. Under this condition, the nut 13 is screwed onto the male threaded part 12e of the pinion gear 12. The rotor 3 is thereby fixed to the pinion gear 12. A bail arm 44 is mounted to the outer peripheral side of the tip of the first rotor arm 31 for leading the fishing line to the spool 4, while being pivotable between a fishing-line releasing position and a fishing-line winding position.

The rotor 3 accommodates an anti-reverse mechanism 50 in the inside of the tubular portion 30 thereof. The anti-reverse mechanism 50 is configured to prevent or allow reverse rotation of the rotor 3. The anti-reverse mechanism 50 includes a one-way clutch 51 and a switching lever 52. The one-way clutch 51 is of a roller-type that the inner race thereof is freely rotatable. The switching lever 52 is configured to switch the one-way clutch 51 between an activated state (i.e., an anti-reverse rotational state) and a deactivated state (i.e., a reverse rotational state). The switching lever 52 is pivotably mounted to the reel body 2a. A cam (not illustrated in the drawings) is disposed on the tip of the switching lever 52. When the switching lever 52 is pivoted, the cam is configured to switch the one-way clutch 51 between the activated state and the deactivated state.

As illustrated in FIG. 1, the spool 4 is mounted to the tip of the spool shaft 15 through the drag mechanism 60, while being disposed between the first and second rotor arms 31 and 32 of the rotor 3. The spool 4 has a bobbin trunk 4a, a flange 4b and a skirt 4c. The bobbin trunk 4a is a part for winding the fishing line about the outer periphery thereof. The flange 4b is a large diameter part disposed on the front end of the bobbin trunk 4a. The skirt 4c is a tubular part extending from the bobbin trunk 4a to the rearward. The skirt 4c is herein integrally formed with the bobbin trunk 4a.

The drag mechanism 60 is configured to brake rotation of the spool 4. The dram mechanism 60 includes a drag regulation knob 61 and a brake portion 62. The drag regulation knob 61 is screwed onto the tip of the spool shaft 15. The brake portion 62 is configured to brake the spool 4, while being pressed by the drag regulation knob 61.

<Action of Spinning Reel>

In fishing with the spinning reel 100 thus structured, the bail arm 44 is set in the fishing-line guiding position after casting. Then an angler waits for prey (e.g., fish) to bite bate. When prey gets caught in the terminal tackle, the angler rotates the handle 1 in the fishing-line winding direction. The drive gear 11 is rotated in conjunction with the rotation of the handle 1, and further, the pinion gear 12 meshed with the drive gear 11 is rotated. The rotor 3 is accordingly rotated in the fishing-line winding direction, and the released fishing line is wound about the spool 4. At this time, the tips of the gear teeth of the pinion gear 12 make contact with the first tooth surfaces 11d of the drive gear 11. At least one first tooth surface 11d is provided with the waveform regulating part 16. Therefore, when the drive gear 11 rotates the pinion gear 12, vibrations transmitted to the handle 1 during meshing are a complicated combination of vibrations having waveforms with different periods and different amplitudes as represented in FIG. 6. Thus, the waveform WS is set in the irregular pattern and it is possible to obtain texture vibrations that are just like vibrations to be produced when a given object is slid along the surface of a texture made of fibers (e.g., silk or velvet). This enables the angler to feel that the rotational feeling transmitted to the handle 1 has been further enhanced in the spinning reel 100.

Second Exemplary Embodiment

In the first exemplary embodiment, the present invention has been explained by using the drive gear 11 for the spinning reel 100 as an exemplary fishing reel. By contrast, in the second exemplary embodiment, as illustrated in FIG. 8, the present invention will be explained by using a drive gear 131 for a dual-bearing reel 200 (an exemplary fishing reel) as another exemplary fishing reel.

Figure 7:
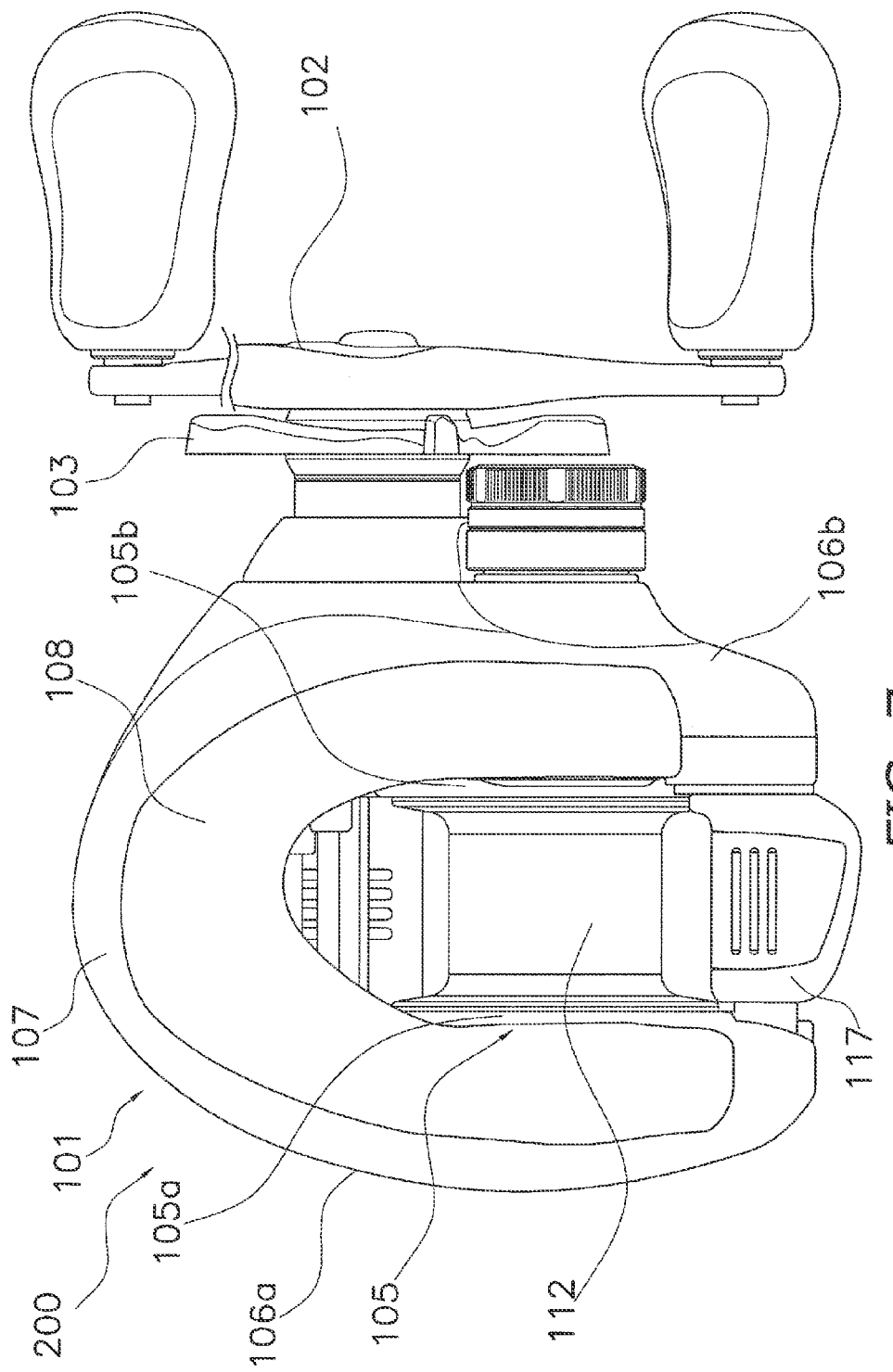
FIG. 7 is a plan view of a dual-bearing reel employing a second exemplary embodiment of the present invention.
Figure 8:
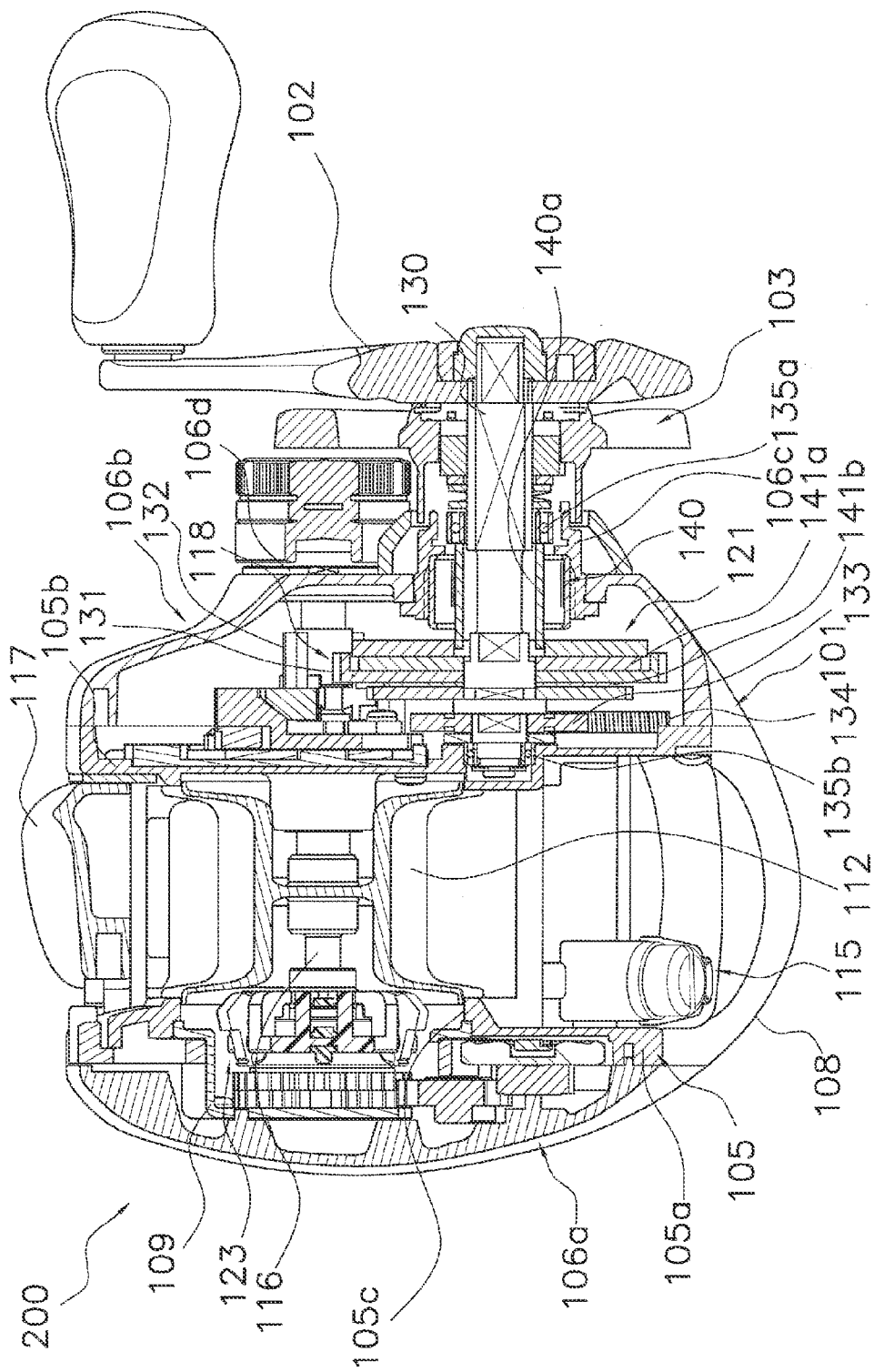
FIG. 8 is a cross-sectional plan view of the dual-bearing reel.

As illustrated in FIGS. 7 and 8, the dual-bearing reel 200 employing the second exemplary embodiment of the present invention is a compact low-profile reel for bait-casting. The dual-bearing reel 200 includes a reel unit 101, a handle 102 for spool rotation and a star drag 103 for drag regulation. The handle 102 is disposed laterally relative to the reel unit 101. The star drag 103 is disposed on the same side as the reel unit 101 with respect to the handle 102.

<Reel Unit>

The reel unit 101 includes a frame 105, a first side cover 106a and a second side cover 106b. The first and second side covers 106a and 106b are mounted to the both lateral sides of the frame 105. The reel unit 101 further includes a front cover 107 and a thumb rest 108. The front cover 107 covers the front side of the reel unit 101, whereas the thumb rest 108 covers the top side of the reel unit 101. As illustrated in FIG. 8, the reel unit 101 yet further includes a shaft strut portion 109 to be screwed to first side cover 106a. A spool 112 for winding a fishing line is rotatably and detachably mounted inside the reel unit 101.

The frame 105 has a pair of a first side plate 105a and a second side plate 105b and a plurality of coupling portions (not illustrated in the drawings). The first and second side plates 105a and 105b are disposed in opposition to each other at a predetermined interval. The coupling portions couple the first side plate 105a and the second side plate 105b. The first side plate 105a has a first opening 105c bored for enabling the spool 112 to pass therethrough.

The first side cover 106a is supported by the rear part of the first side plate 105a and that of the second side plate 105b, while being rotatable and axially movable. The first side cover 106a is openable and closable.

The front cover 107 and the thumb rest 108 are screwed to the frame 105. The shaft strut portion 109 is a closed-end tubular member. The shaft strut portion 109 supports one end of a spool shaft 116.

The second side cover 106b is screwed to the second side plate 105b. The second side cover 106b has a first boss 106c and a second boss 106d. The first boss 106c supports a drive shaft 130 (to be described) to which the handle 102 is coupled. The second boss 106d supports the spool shaft 116 to which the spool 112 is fixed.

The spool 112, a level wind mechanism 115 and a clutch operating member 117 are disposed inside the frame 105. The level wind mechanism 115 evenly winds the fishing line about the spool 112. The clutch operating member 117 functions as a thumb rest in thumbing the fishing line. The spool 112 is capable of passing through the first opening 105c of the first side plate 105a. Further, a rotation transmission mechanism 118, mechanisms not illustrated in the drawings (i.e., a clutch mechanism, a clutch control mechanism and a casting control mechanism) and a drag mechanism 121 are disposed between the frame 105 and the second side cover 106b. The rotation transmission mechanism 118 is a mechanism configured to transmit rotational force from the handle 102 to the spool 112 and the level wind mechanism 115. The clutch control mechanism is a mechanism configured to engage/disengage and control the clutch mechanism in response to an operation of the clutch operating member 117. The casting control mechanism is a brake mechanism configured to regulate resistive force to be applied during rotation of the spool 112. Further, a spool brake device 123 is disposed between the frame 105 and the first side cover 106a. The spool brake device 123 is a device configured to inhibit occurrence of backlash in casting.

The spool 112 is a member that the fishing line is wound about the outer periphery thereof. The spool shaft 116 extends outward of the second side cover 106b, while penetrating through the second side plate 105b. The extending end (the other end) of the spool shaft 116 is supported by the second side cover 106b.

<Rotor Transmission Mechanism>

As illustrated in FIG. 8, the rotation transmission mechanism 118 includes the drive shaft 130, the drive gear 131, a pinion gear 132, a first gear 133 and a second gear 134. The drive shaft 130 is a member that the handle 102 is coupled thereto while being unitarily rotatable therewith. The drive gear 131 is mounted onto the drive shaft 130. The pinion gear 132 is meshed with the drive gear 131. The first gear 133 is coupled to the drive shaft 130, while being unitarily rotatable therewith. The second gear 134 is meshed with the first gear 133. The second gear 134 reciprocates the right and left the level wind mechanism 115 in conjunction with rotation of the handle 102.

The drive shaft 130 is rotatable only in the fishing-line winding direction by a one-way clutch 140 mounted to the first boss 106c of the reel unit 101. The drive shaft 130 is rotatably supported by the reel unit 101 through a first bearing 135a and a second bearing 135b. The first bearing 135a is mounted to the first boss 106c of the second side cover 106b. The second bearing 135b is mounted to the second side plate 105b.

Figure 9:
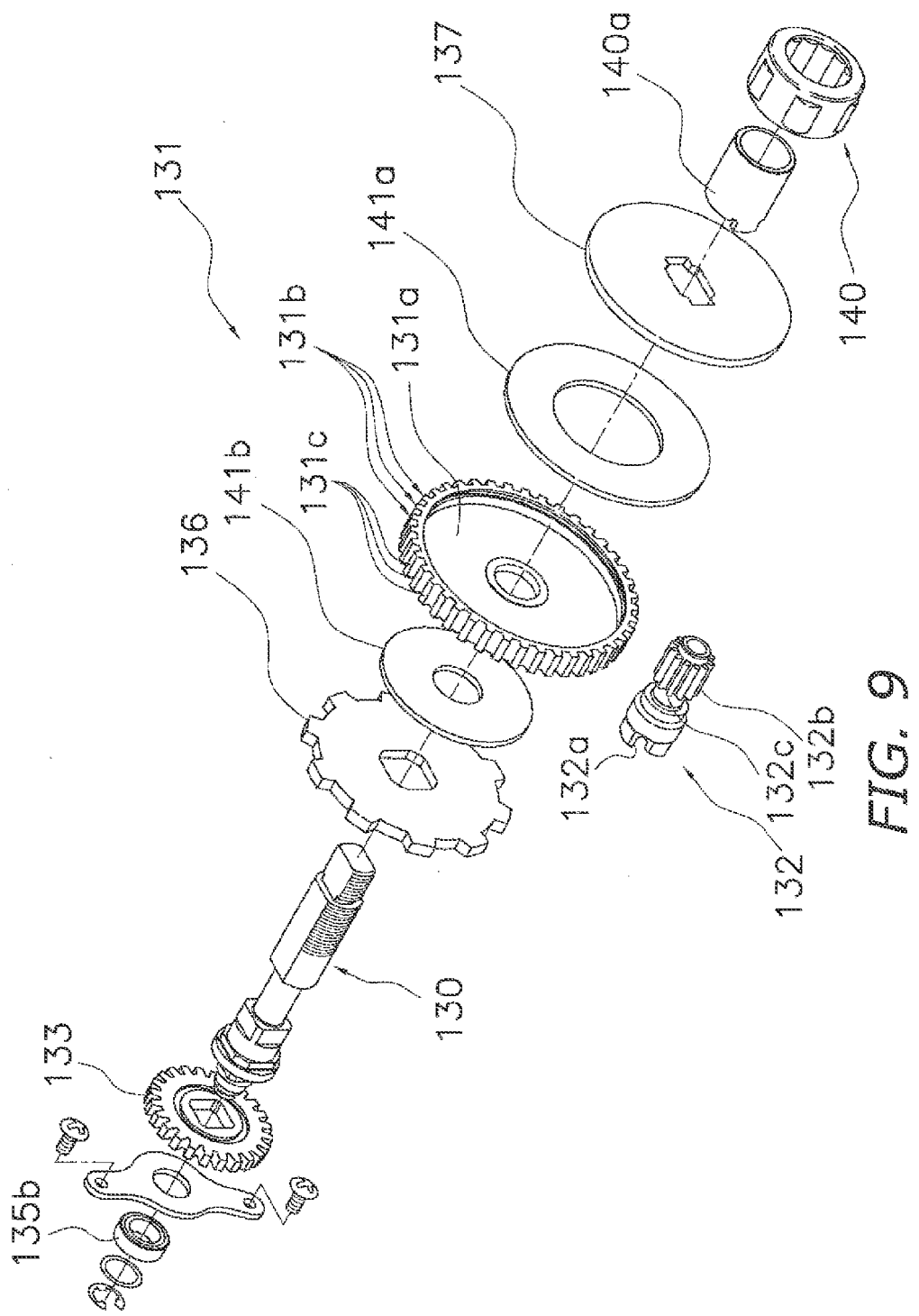
FIG. 9 is an exploded perspective view of a rotation transmission mechanism.

As illustrated in FIG. 9, a ratchet wheel 136, functioning as a drag receiver member for receiving drag force of the drag mechanism 121, is mounted to the drive shaft 130, while being unitarily rotatable therewith. The ratchet wheel 136 functions not only as the drag receiver member but also as a clutch return mechanism for returning the clutch mechanism from a clutch-off state to a clutch-on state.

Further, the drive gear 131 is rotatably mounted to the drive shaft 130, and a drag plate 137 of the drag mechanism 121 is also mounted to the drive shaft 130 while being unitarily rotatable therewith. Further yet, the star drag 103 is screwed onto the drive shaft 130. The handle 102 is mounted to the drive shaft 130, while being unitarily rotatable therewith.

Figure 10A:
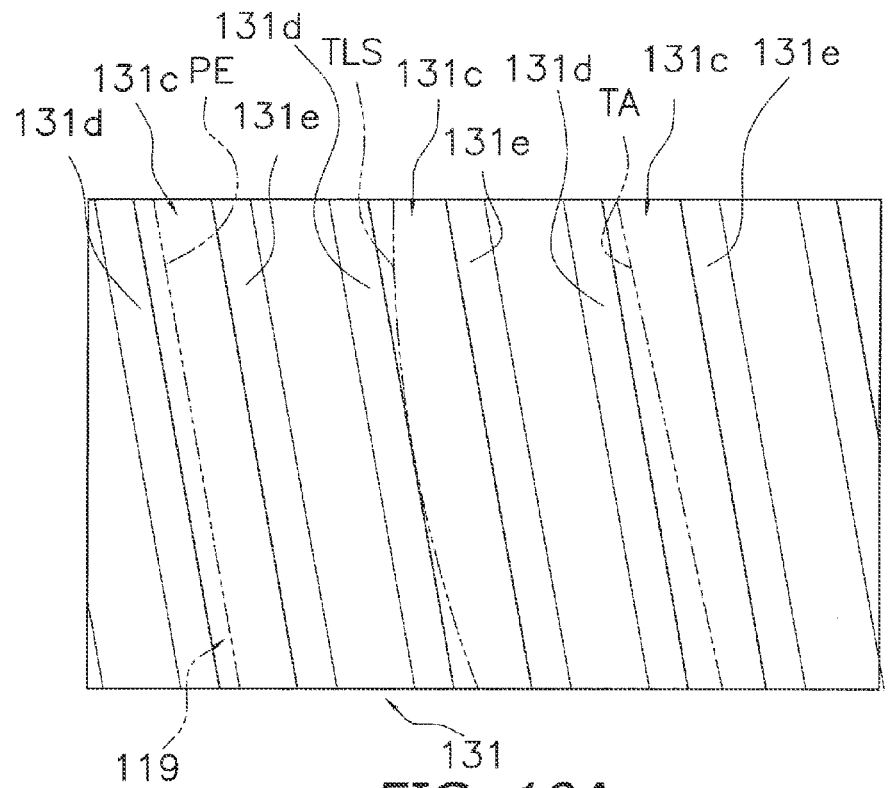
FIG. 10A is a schematic side view of a waveform regulating part of a drive gear in the dual-bearing reel.
Figure 10B:
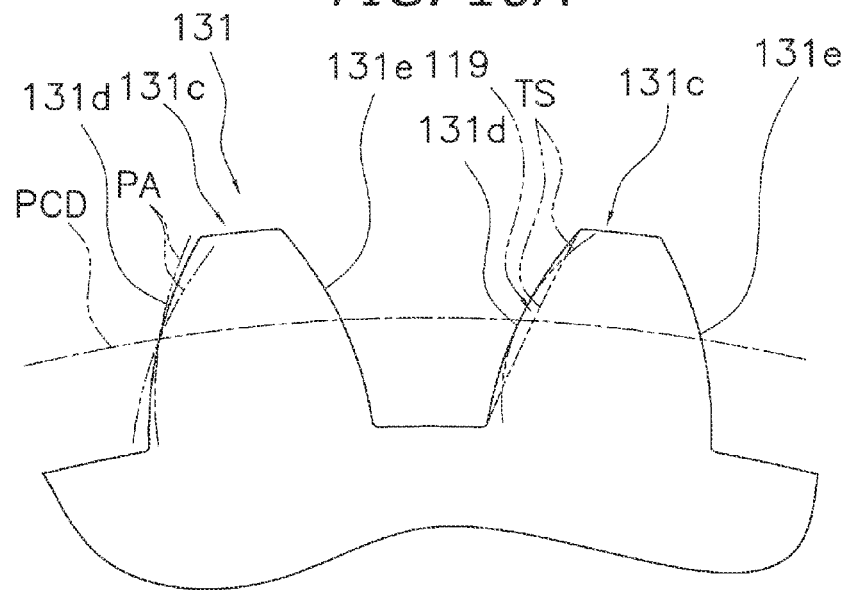
FIG. 10B is a schematic plan view of a waveform regulating part of a drive gear in the dual-bearing reel.

As illustrated in FIG. 9, the drive gear 131 is, for instance, a cylindrical gear with a module of roughly 1 and a teeth number of roughly 42. Therefore, the drive gear 131 has a pitch circle diameter (PCD) of roughly 42 mm. In FIG. 9, the drive gear 131 is depicted as a gear with spur teeth for convenience of illustration. However, the drive gear 131 is actually produced as a cylindrical gear with helical teeth. The drive gear 131 has a gear body 131a, a plurality of drive gear teeth 131b and at least one waveform regulating part 119. The gear body 131a has a disc shape. The drive gear teeth 131b are disposed on the outer peripheral side of the gear body 131a, while being circumferentially disposed at intervals. The drive gear teeth 131b are meshed with the pinion gear 132. For example, the drive gear 131 is formed by die casting, rolling or so forth, stainless alloy. The drive gear teeth 131b have helical teeth 131c with the torsion angle TA of 20 degrees or less. As illustrated in FIGS. 10A and 10B, each helical tooth 131c has a first tooth surface 131d and a second tooth surface 131e. The first tooth surface 131d is configured to be meshed with the pinion gear 132 when the handle 102 is rotated in the fishing-line winding direction. The second tooth surface 131e is configured to be meshed with the pinion gear 132 when the handle 102 is rotated in the fishing-line releasing direction.

As illustrated in FIGS. 10A and 10B, the waveform regulating part 119 is disposed on the first tooth surface 131d. As illustrated in FIG. 6, the waveform regulating part 119 regulates the waveform WS in an irregular pattern. The waveform WS is a waveform of vibration produced when the drive gear 131 is meshed with the pinion gear 132. Incidentally, the shapes of the first tooth surfaces 131d of the plural helical teeth 131c are normally formed as precisely as possible, while the pitches of the helical teeth 131c are set to be equal. Unlike this precision, at least one waveform regulating part 119 is formed by purposefully causing at least one of the helical teeth 131c to be different from the rest of the helical teeth 131c regarding the shape or the pitch. Specifically, as depicted with dashed two-dotted lines in FIG. 10, the at least one waveform regulating part 119 regulates the waveform WS in the irregular pattern by causing at least one of the helical teeth 131c to be different from the rest of the helical teeth 131c regarding at least one feature selected from the group including the pressure angle PA, the pitch PE, the torsion (or helix) angle TA, the tooth profile shape TS and the tooth trace shape TLS.

As illustrated in FIG. 9, the pinion gear 132 is a tubular member that the spool shaft 116 (see FIG. 8) penetrates through the center thereof. The pinion gear 132 is rotatably supported by the reel unit 101. Further, the pinion gear 132 is mounted to the reel unit 101, while being movable in the spool shaft direction. The pinion gear 132 has an engaged groove 132a formed on one end thereof. The engaged groove 132a is formed along the diameter of the pinion gear 132. The engaged groove 132a is engaged with an engaging pin of the clutch mechanism (not illustrated in the drawings). The pinion gear 132 has pinion gear teeth 132b formed on the other end part thereof. The pinion gear teeth 132b are meshed with the drive gear teeth 131b of the drive gear 131. The pinion gear 132 has a narrowed part 132c formed between the engaged groove 132a and the pinion gear teeth 132b. The clutch control mechanism is engaged with the narrowed part 132c. When the clutch operating member 117 is operated and located in a clutch-off position, the pinion gear 132 is configured to be moved to an off-position located on the right side (i.e., the same side as the second side cover 106b) of an on-position in FIG. 8. Accordingly, the clutch mechanism is set to be in the clutch-off state.

The second gear 134 is coupled to a warm shaft (not illustrated in the drawings) of the level wind mechanism 115, while being unitarily rotatable therewith.

In the clutch-on state, the drag mechanism 121 is configured to brake rotation of the spool 112 in the fishing-line releasing direction through the drive gear 131. Drag force of the drag mechanism 121 is regulated by the star drag 103. As illustrated in FIGS. 8 and 9, the drag mechanism 121 is configured to slip the drive gear 131 by transmitting the rotation of the handle 102 and the pressing force of the star drag 103 to the drive gear 131 through an inner race 140*a* of the one-way clutch 140. The rotation of the spool 112 is thereby braked in the fishing-line releasing direction. The drag mechanism 121 includes the ratchet wheel 136 and the drag plate 137 coupled to the inner race 140*a* in a unitarily rotatable state. To smoothly slip the drive gear 131 in drag actuation, a first drag washer 141*a* is mounted between the drag plate 137 and the drive gear 131, whereas a second drag washer 141*b* is mounted between the drive gear 131 and the ratchet wheel 136. The first and second drag washers 141*a* and 141*b* are made of felt or graphite.

<Action of Dual-Bearing Reel>

Next, an action of the dual-bearing reel will be explained.

In releasing the fishing line, the clutch mechanism is switched into the clutch-off state by operating the clutch operating member 117. As a result, the spool 112 becomes freely rotatable. In casting, the spool 112 is rotated in the fishing-line releasing direction and releases the fishing line that a terminal tackle is attached to the tip thereof.

When the terminal tackle lands in the water, an angler rotates the handle 102 in the fishing-line winding direction and the clutch mechanism is thereby switched into the on-state. Accordingly, the handle 102 and the spool 112 are coupled. When a prey (e.g., fish) gets caught in the terminal tackle, the angler rotates the handle 102 in the fishing-line winding direction. Then, the drive gear 131 is rotated in conjunction with the rotation of the handle 102, and the pinion gear 132 meshed with the drive gear 131 is rotated. Accordingly, the spool 112 is rotated in the fishing-line winding direction, and the released fishing line is wound about the spool 112. At this time, the tips of the gear teeth of the pinion gear 132 make contact with the first tooth surfaces 131*d* of the drive gear 131. At least one first tooth surface 131*d* includes the waveform regulating part 119. Therefore, when the drive gear 131 rotates the pinion gear 132, vibrations transmitted to the handle 102 in meshing are a complicated combination of vibrations having waveforms with different periods and different amplitudes as represented in FIG. 6. Thus, the waveform WS is set in the irregular pattern and it is possible to obtain texture vibrations that are just like vibrations produced when a given object is slid along the surface of a texture made of fibers (e.g., silk or velvet). This enables the angler to feel that the rotational feeling transmitted to the handle 102 has been further enhanced in the dual-bearing reel 200.

Next, when the fishing line is released by pull of a fish or the like, rotation of the spool 112 is transmitted to the drive gear 131, and is then transmitted to the drive shaft 130 and the one-way clutch 140 through the drag mechanism 121. The one-way clutch 140 prevents reverse rotation of the drive shaft 130. When the fishing line is weakly pulled by a fish, the spool 112 is not rotated and therefore the fishing line is not released. When the fishing line is strongly pulled by a fish and the rotational force of the spool 112 is increased, the rotational force to be transmitted therefrom exceeds a set rotational resistive force of the drag mechanism 121. Accordingly, a slip occurs in the drag mechanism 121, and the spool 112 and its relevant portions including the drive gear 131 start rotating. At this time, the drag mechanism 121 constantly applies predetermined resistive force, i.e., drag force to the spool 112.

Other Exemplary Embodiments

Exemplary embodiments of the present invention have been explained above. However, the present invention is not limited to the aforementioned exemplary embodiments, and a variety of changes can be made without departing from the scope of the present invention. Especially, the plurality of exemplary embodiments and modifications described in the present specification can be arbitrarily combined on an as-needed basis.

(a) In each of the first and second exemplary embodiments, the drive gear 11 (or 131) includes the at least one waveform regulating part 16 (or 119). However, at least one of the pinion gear teeth 12*b* (or 132*b*) of the pinion gear 12 (or 132) may have the waveform regulating part 16 (or 119) as illustrated in FIG. 5A and FIG. 5B (or 10A and 10B) on the surface thereof configured to be contacted to the drive gear 11 (or 131) in winding the fishing line. In the structure, it is possible to achieve advantageous effects similar to those achieved in the first (or second) exemplary embodiment. It should be noted that the number of teeth of the pinion gear 12 (or 132) is less than that of the drive gear 11 (or 131). Hence, the waveform WS of the pinion gear 12 (or 132) varies less in comparison with the drive gear 11 (or 131). It is thus preferable to provide at least one waveform regulating part 16 (or 119) for the drive gear 11 (or 131) having the number of teeth greater than that of the pinion gear 12 (or 132).

(b) In each of the aforementioned exemplary embodiments, at least one waveform regulating part 16 (or 119) is configured to regulate the waveform WS by causing at least one of the face gear teeth 11*c* (or the helical teeth 131*c*) to be different from the rest of the face gear teeth 11*c* (or the helical teeth 131*c*) regarding the tooth profile shape TS. However, the present invention is not limited to this configuration. The waveform regulating part 16 (or 119) may be arbitrarily set as long as it is configured to regulate the waveform WS in the irregular pattern by causing at least one of the face gear teeth 11*c* (or the helical teeth 131*c*) to be different from the rest of the face gear teeth 11*c* (or the helical teeth 131*c*) regarding at least one feature selected from the group consisting of the pressure angle PA, the pitch PE, the torsion angle TA, the tooth profile shape TS and the tooth trace shape TLS. For example, at least one of the face gear teeth 11*c* (or the helical teeth 131*c*) may be different from the rest of the face gear teeth 11*c* (or the helical teeth 131*c*) regarding the combination of the pressure angle PA and the tooth profile shape TS. Alternatively, at least one of the face gear teeth 11*c* (or the helical teeth 131*c*) may be different from the rest of the face gear teeth 11*c* (or the helical teeth 131*c*) regarding the combination of the tooth trace shape TLS and the torsion angle TA.

(c) In the second exemplary embodiment, the present invention has been explained by a cylindrical gear having helical teeth. However, the present invention is also applicable to a cylindrical gear with double helical teeth or spur teeth.

(d) In the first exemplary embodiment, the present invention has been explained by a spinning reel of the front drag type as a type of spinning reel. However, the present invention is applicable to all the types of spinning reels such as a spinning reel of a rear drag type, a spinning reel of a rotor brake type with a lever, and a spinning reel configured to be capable of switching activation of two types of brake mechanisms.

(e) In the first and second exemplary embodiments, the dual-bearing reel (including an electric reel) and the spinning reel have been exemplified as fishing reels. However, the present invention is also applicable to the other fishing reels. For example, the present invention is also applicable to a spin cast reel including a drive gear and a single-bearing reel including a drive gear.

<Features>

The aforementioned exemplary embodiments can be expressed as follows.

(A) The drive gear 11 (or 131) for the spinning reel 100 (or the dual-bearing reel 200) is mounted onto the drive shaft 10 (or 130) for the spinning reel 100 (or the dual-bearing reel 200), and is meshed with the pinion gear 12 (or 132). The drive gear 11 (or 131) includes the gear body 11a (or 131a) having a disc shape, the plural drive gear teeth 11b (or 131b) and the waveform regulating part 16 (or 119). The gear body 11a (or 131a) is mounted onto the drive shaft 10 (or 130). The plural drive gear teeth 11b (or 131b) are disposed on the outer peripheral side of the gear body 11a (or 131a), are circumferentially disposed at intervals and are meshed with the pinion gear 12 (or 132). The waveform regulating part 16 (or 119) is disposed on at least a part of the plural drive gear teeth 11b (or 131b) and is configured to regulate the waveform WS of vibration produced in meshing with the pinion gear 12 (132) in the irregular pattern. The waveform regulating part 16 (or 119) is configured to regulate the waveform WS in the irregular pattern by causing at least one of the drive gear teeth 11b (or 131b) to be different from the rest of the drive gear teeth 11b (or 131b) regarding at least one feature selected from the group consisting of the pressure angle PA, the pitch PE, the torsion angle TA, the tooth profile shape TS and the tooth trace shape TLS.

According to the drive gear 11 (or 131), the waveform regulating part 16 (or 119) causes at least one of the drive gear teeth 11b (or 131b) to be different from the rest of the drive gear teeth 11b (or 131b) regarding at least one feature selected from the group consisting of the pressure angle PA, the pitch PE, the torsion angle TA, the tooth profile shape TS and the tooth trace shape TLS. Thus, vibrations transmitted to the handle 1 (or 102) are a complicated combination of vibrations. It is thereby possible to obtain texture vibrations that are just like vibrations produced when a given object is slid along the surface of a texture made of fibers (e.g., silk or velvet). Consequently, it is possible to further enhance the rotational feeling to be transmitted to the handle 1 (or 102) in the spinning reel 100 (or the dual-bearing reel 200).

(B) The waveform regulating part 16 (or 119) may be configured to regulate the waveform WS in the irregular pattern by causing at least one of the drive gear teeth 11b (or 131b) to be different from the rest of the drive gear teeth 11b (or 131b) regarding at least the pressure angle PA. According to the structure, the waveform WS can be relatively easily set in the irregular pattern.

(C) The waveform regulating part 16 (or 119) may be configured to regulate the waveform WS in the irregular pattern by causing at least one of the drive gear teeth 11b (or 131b) to be different from the rest of the drive gear teeth 11b (or 131b) regarding at least the pitch PE. According to the structure, the period and the amplitude of vibration can be changed by changing the pitch PE. The waveform WS can be thereby changed into the irregular pattern.

(D) The waveform regulating part 16 (or 119) may be configured to regulate the waveform WS in the irregular pattern by causing at least one of the drive gear teeth 11b (or 131b) to be different from the rest of the drive gear teeth 11b (or 131b) regarding at least the torsion angle TA. According to the structure, the period and the amplitude of vibration can be changed by changing the torsion angle TA. The waveform WS can be thereby changed into the irregular pattern.

(E) The waveform regulating part 16 (or 119) may be configured to regulate the waveform WS in the irregular pattern by causing at least one of the drive gear teeth 11b (or 131b) to be different from the rest of the drive gear teeth 11b (or 131b) regarding at least the tooth profile shape TS. According to the structure, the period and the amplitude of vibration can be changed by changing the tooth profile shape TS. The waveform WS can be thereby changed into the irregular pattern.

(F) The waveform regulating part 16 (or 119) may be configured to regulate the waveform WS in the irregular pattern by causing at least one of the drive gear teeth 11b (or 131b) to be different from the rest of the drive gear teeth 11b (or 131b) regarding at least the tooth trace shape TLS. According to the structure, the period and the amplitude of vibration can be changed by changing the tooth trace shape TLS. The waveform WS can be thereby changed into the irregular pattern.

(G) The drive gear teeth 11b may include the face gear teeth 11 formed on the outer peripheral surface of the gear body 11a. According to the structure, it is possible to further enhance the rotational feeling transmitted to the handle 1 in the spinning reel 100.

(H) The drive gear teeth 131b may include either spur teeth or the helical teeth 131c formed on the outer peripheral surface of the gear body 131a. According to the structure, it is possible to further enhance the rotational feeling transmitted to the handle 102 in the dual-bearing reel 200.

What is claimed is:

1. A drive gear for a fishing reel, comprising:
   a gear body having an outer peripheral side and a disc shape, and being mounted onto a drive shaft;
   a plurality of drive gear teeth disposed on the outer peripheral side of the gear body, being circumferentially disposed at intervals, and being configured to be meshed with a pinion gear; and
   a waveform regulating part disposed on at least a part of the drive gear teeth and being configured to regulate a waveform of a vibration produced when the drive gear teeth are meshed with the pinion gear in an irregular pattern,
   the waveform regulating part being configured to regulate the waveform in the irregular pattern by having at least one feature of the drive gear teeth be different from a remainder of the drive gear teeth, the at least one feature being selected from the group consisting of a pressure angle, a pitch, a torsion angle, a tooth profile shape and a tooth trace shape.

2. The drive gear for a fishing reel according to claim 1, wherein
   the waveform regulating part is configured to regulate the waveform in the irregular pattern by having the at least one feature of the drive gear teeth being different from the remainder of the drive gear teeth be at least the pressure angle.

3. The drive gear for a fishing reel according to claim 2, wherein
   the waveform regulating part is configured to regulate the waveform in the irregular pattern by having the at least one feature of the drive gear teeth being different from the remainder of the drive gear teeth be the pitch.

4. The drive gear for a fishing reel according to claim 2, wherein
   the waveform regulating part is configured to regulate the waveform in the irregular pattern by having the at least one feature of the drive gear teeth being different from the remainder of the drive gear teeth be the torsion angle.

5. The drive gear for a fishing reel according to claim 2, wherein
the waveform regulating part is configured to regulate the waveform in the irregular pattern by having the at least one feature of the drive gear teeth being different from the remainder of the drive gear teeth be the tooth profile shape.

6. The drive gear for a fishing reel according to claim 2, wherein
the waveform regulating part is configured to regulate the waveform in the irregular pattern by having the at least one feature of the drive gear teeth being different from the remainder of the drive gear teeth be the tooth trace shape.

7. The drive gear for a fishing reel according to claim 1, wherein
the waveform regulating part is configured to regulate the waveform in the irregular pattern by having the at least one feature of the drive gear teeth being different from the remainder of the drive gear teeth be the pitch.

8. The drive gear for a fishing reel according to claim 7, wherein
the waveform regulating part is configured to regulate the waveform in the irregular pattern by having the at least one feature of the drive gear teeth being different from the remainder of the drive gear teeth be the torsion angle.

9. The drive gear for a fishing reel according to claim 7, wherein
the waveform regulating part is configured to regulate the waveform in the irregular pattern by having the at least one feature of the drive gear teeth being different from the remainder of the drive gear teeth be the tooth profile shape.

10. The drive gear for a fishing reel according to claim 7, wherein
the waveform regulating part is configured to regulate the waveform in the irregular pattern by having the at least one feature of the drive gear teeth being different from the remainder of the drive gear teeth be the tooth trace shape.

11. The drive gear for a fishing reel according to claim 1, wherein
the waveform regulating part is configured to regulate the waveform in the irregular pattern by having the at least one feature of the drive gear teeth being different from the remainder of the drive gear teeth be the torsion angle.

12. The drive gear for a fishing reel according to claim 11, wherein
the waveform regulating part is configured to regulate the waveform in the irregular pattern by having the at least one feature of the drive gear teeth being different from the remainder of the drive gear teeth be the tooth profile shape.

13. The drive gear for a fishing reel according to claim 11, wherein
the waveform regulating part is configured to regulate the waveform in the irregular pattern by having the at least one feature of the drive gear teeth being different from the remainder of the drive gear teeth be the tooth trace shape.

14. The drive gear for a fishing reel according to claim 1, wherein
the waveform regulating part is configured to regulate the waveform in the irregular pattern by having the at least one feature of the drive gear teeth being different from the remainder of the drive gear teeth be the tooth profile shape.

15. The drive gear for a fishing reel according to claim 14, wherein
the waveform regulating part is configured to regulate the waveform in the irregular pattern by having the at least one feature of the drive gear teeth being different from the remainder of the drive gear teeth be the tooth trace shape.

16. The drive gear for a fishing reel according to claim 1, wherein
the waveform regulating part is configured to regulate the waveform in the irregular pattern by having the at least one feature of the drive gear teeth being different from the remainder of the drive gear teeth be the tooth trace shape.

17. The drive gear for a fishing reel according to claim 1, wherein
the drive gear teeth include face gear teeth disposed on an outer peripheral surface of the gear body.

18. The drive gear for a fishing reel according to claim 1, wherein
the drive gear teeth include one of spur teeth and helical teeth disposed on an outer peripheral surface of the gear body.

19. A pinion gear for a fishing reel, comprising:
a gear body having an outer peripheral surface and a tubular shape, and being configured to enable a spool shaft to penetrate therethrough:
a plurality of pinion gear teeth disposed on the outer peripheral surface of the gear body, being circumferentially disposed at intervals and being configured to be meshed with drive gear teeth of a drive gear mounted on a drive shaft; and
a waveform regulating part disposed on at least a part of the pinion gear teeth and being configured to regulate a waveform of a vibration produced when the pinion gear teeth are meshed with the drive gear teeth of the drive gear in an irregular pattern,
the waveform regulating part being configured to regulate the waveform in the irregular pattern by having at least one feature of the pinion gear teeth be different from the rest of the pinion gear teeth, the at least one feature being selected from the group consisting of a pressure angle, a pitch, a torsion angle, a tooth profile shape and a tooth trace shape.

* * * * *